US007041908B2

(12) United States Patent
Hall et al.

(10) Patent No.: US 7,041,908 B2
(45) Date of Patent: *May 9, 2006

(54) DATA TRANSMISSION SYSTEM FOR A DOWNHOLE COMPONENT

(75) Inventors: David R. Hall, Provo, UT (US); Tracy H. Hall, Jr., Provo, UT (US); David S. Pixton, Lehi, UT (US); Scott Steven Dahlgren, Alpine, UT (US); Joe Fox, Spanish Fork, UT (US); Cameron Sneddon, Lombard, IL (US); Michael A. Briscoe, Lehi, UT (US)

(73) Assignee: IntelliServ, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/904,688

(22) Filed: Nov. 23, 2004

(65) Prior Publication Data

US 2005/0145406 A1    Jul. 7, 2005

Related U.S. Application Data

(63) Continuation of application No. 10/358,099, filed on Feb. 2, 2003, now Pat. No. 6,844,498.

(60) Provisional application No. 60/444,100, filed on Jan. 31, 2003.

(51) Int. Cl.
*H02G 15/02* (2006.01)
(52) U.S. Cl. .................................... 174/75 C; 439/194
(58) Field of Classification Search .............. 174/21 R, 174/75 C, 88 C, 84 R; 439/191, 192, 194; 336/132; 324/338; 285/333
See application file for complete search history.

(56) References Cited

U.S. PATENT DOCUMENTS 6,844,498 B1 *    1/2005    Hall et al. ................ 174/75 C

\* cited by examiner

*Primary Examiner*—Chau N. Nguyen
(74) *Attorney, Agent, or Firm*—Tyson J. Wilde; Jeffery E. Daly

(57) ABSTRACT

The invention is a system for transmitting data through a string of downhole components. In accordance with one aspect of the invention, the system includes a plurality of downhole components, such as sections of pipe in a drill string. Each component has a first and second end, with a first communication element located at the first end and a second communication element located at the second end. Each communication element includes a first contact and a second contact. The system also includes a coaxial cable running between the first and second communication elements, the coaxial cable having a conductive tube and a conductive core within it. The system also includes a first and second connector for connecting the first and second communication elements respectively to the coaxial cable. Each connector includes a conductive sleeve, lying concentrically within the conductive tube, which fits around and makes electrical contact with the conductive core. The conductive sleeve is electrically isolated from the conductive tube. The conductive sleeve of the first connector is in electrical contact with the first contact of the first communication element, the conductive sleeve of the second connector is in electrical contact with the first contact of the second communication element, and the conductive tube is in electrical contact with both the second contact of the first communication element and the second contact of the second communication element.

56 Claims, 8 Drawing Sheets

DATA TRANSMISSION SYSTEM FOR A DOWNHOLE COMPONENT

CROSS REFERENCE TO RELATED APPLICATIONS

This application is a continuation of U.S. application Ser. No. 10/358,099 filed Feb. 2, 2003 now U.S. Pat. No. 6,844,498, to Hall et, al., which is herein incorporated by reference for all that it contains. U.S. application Ser. No. 10/604,812 claims priority of Provisional U.S. Patent Application Ser. No. 60/444,100 filed on Jan. 31, 2003, which is also herein incorporated by reference for all that it contains.

FEDERAL SPONSORSHIP

This invention was made with government support under Contract No. DE-FC26-01NT41229 awarded by the U.S. Department of Energy. The government has certain rights in the invention.

BACKGROUND OF THE INVENTION

The present invention relates to the field of electrical connectors, particularly connectors for coaxial cables. The preferred connectors are particularly well suited for use in harsh environments wherein it is desirable to seal the connection from the elements. One such application is in data transmission systems for downhole environments, such as along a drill string used in oil and gas exploration or along the casings and other equipment used in oil and gas production.

The goal of accessing data from a drill string has been expressed for more than half a century. As exploration and drilling technology has improved, this goal has become more important in the industry for successful oil, gas, and geothermal well exploration and production. For example, to take advantage of the several advances in the design of various tools and techniques for oil and gas exploration, it would be beneficial to have real time data such as temperature, pressure, inclination, salinity, etc. Several attempts have been made to devise a successful system for accessing such drill string data. One such system is disclosed in co-pending U.S. application Ser. No. 09/909,469 (also published as PCT Application WO 02/06716) which is assigned to the same assignee as the present invention. The disclosure of this U.S. application Ser. No. 09/909,469 is incorporated herein by reference.

BRIEF SUMMARY OF THE INVENTION

Briefly stated, the invention is a system for transmitting data through a string of downhole components.

In accordance with one aspect of the invention, the system includes a plurality of downhole components, such as sections of pipe in a drill string. Each component has a first and second end, with a first communication element located at the first end and a second communication element located at the second end. Each communication element includes a first contact and a second contact. The system also includes a coaxial cable running between the first and second communication elements, the coaxial cable having a conductive tube and a conductive core within it. The system also includes a first and second connector for connecting the first and second communication elements respectively to the coaxial cable. Each connector includes a conductive sleeve, lying concentrically within the conductive tube, which fits around and makes electrical contact with the conductive core. The conductive sleeve is electrically isolated from the conductive tube. The conductive sleeve of the first connector is in electrical contact with the first contact of the first communication element, the conductive sleeve of the second connector is in electrical contact with the first contact of the second communication element, and the conductive tube is in electrical contact with both the second contact of the first communication element and the second contact of the second communication element.

The first and second communication elements are preferably inductive coils, and the inductive coils are preferably formed by a single loop of wire. More preferably, the inductive coils include at least one loop of wire set in circular trough of a magnetically conducting, electrically insulating material, preferably ferrite. Preferably, the trough is formed of segments of a magnetically conducting electrically insulating material, with the electrically insulating material segments preferably retained within a groove formed in a metal ring.

In accordance with another aspect of the invention, the components are sections of drill pipe, each having a central bore, and the first and second communication elements are located in a first and second recess respectively at each end of the drill pipe. The system further includes a first passage passing between the first recess and the central bore and a second passage passing between the second recess and the central bore. The first and second connectors are located in the first and second passages respectively. Preferably, each section of drill pipe has a portion with an increased wall thickness at both the box end and the pin end with a resultant smaller diameter of the central bore at the box end and pin end, and the first and second passages run through the portions with an increased wall thickness and generally parallel to the longitudinal axis of the drill pipe.

In accordance with another aspect of the invention, the system includes a first and second expansion plug, each of which includes a central passage and each of which is press-fit within the conductive tube so as to maintain the increased outside diameter of the conductive tube within the larger diameter portions of the first and second passages respectively. The system also preferably includes a first and second retaining plug, each of which includes ridges on its outer surface to retain the expansion plugs in place.

In accordance with another aspect of the invention, the first and second communication elements each includes an inductive coil having at least one loop of wire. In each communication element, there is a water-tight seal between the wire and the inside of the conductive tube. The water-tight seal preferably includes at least one gasket through which the first end of the wire passes and which forms a seal with the inner surface of the conductive tube.

The invention also includes a method of electrically connecting communication elements at opposite ends of a downhole component through a coaxial conductor. The method includes providing a coaxial cable as the conductor between the first and second communication elements. The coaxial cable includes a conductive tube, a conductive core within the conductive tube and a dielectric material between the conductive tube and the conductive tube. The method also includes providing a first and second connector for connecting the first and second respective communication elements to the coaxial cable. The first and second connectors each include a conductive sleeve that fits around and makes electrical contact with the conductive core. The conductive sleeve is electrically isolated from the conductive tube. The method also includes removing a portion of the dielectric material at both ends of the coaxial cable to provide clearance for the conductive sleeve, and sliding the first and second connectors over both ends of the coaxial cable.

In accordance with another aspect of the invention, the method includes expanding the outside diameter of the conductive tube by inserting an expansion plug into each end. The first and second communication elements each include an inductive coil having at least one loop of wire. In each communication element, a first end of the wire is in electrical contact with the conductive tube and a second end of the wire is in electrical contact with the conductive sleeve. The method further includes inserting a water-tight seal between the second end of the wire and the inside of the conductive tube.

The present invention, together with attendant objects and advantages, will be best understood with reference to the detailed description below in connection with the attached drawings.

DETAILED DESCRIPTION OF THE INVENTION AND THE PREFERRED EMBODIMENT

It should be noted that, as used herein, the term "downhole" is intended to have a relatively broad meaning, including such environments as drilling in oil and gas, gas and geothermal exploration, the systems of casings and other equipment used in oil, gas and geothermal production.

It should also be noted that the term "transmission" as used in connection with the phrase data transmission or the like, is intended to have a relatively broad meaning, referring to the passage of signals in at least one direction from one point to another.

It should further be noted that the term "magnetically conductive" refers to a material having a magnetic permeability greater than that of air.

It should further be noted that the term "electrically insulating" means having a high electrical resistivity, preferably greater than that of steel.

Figure 1:
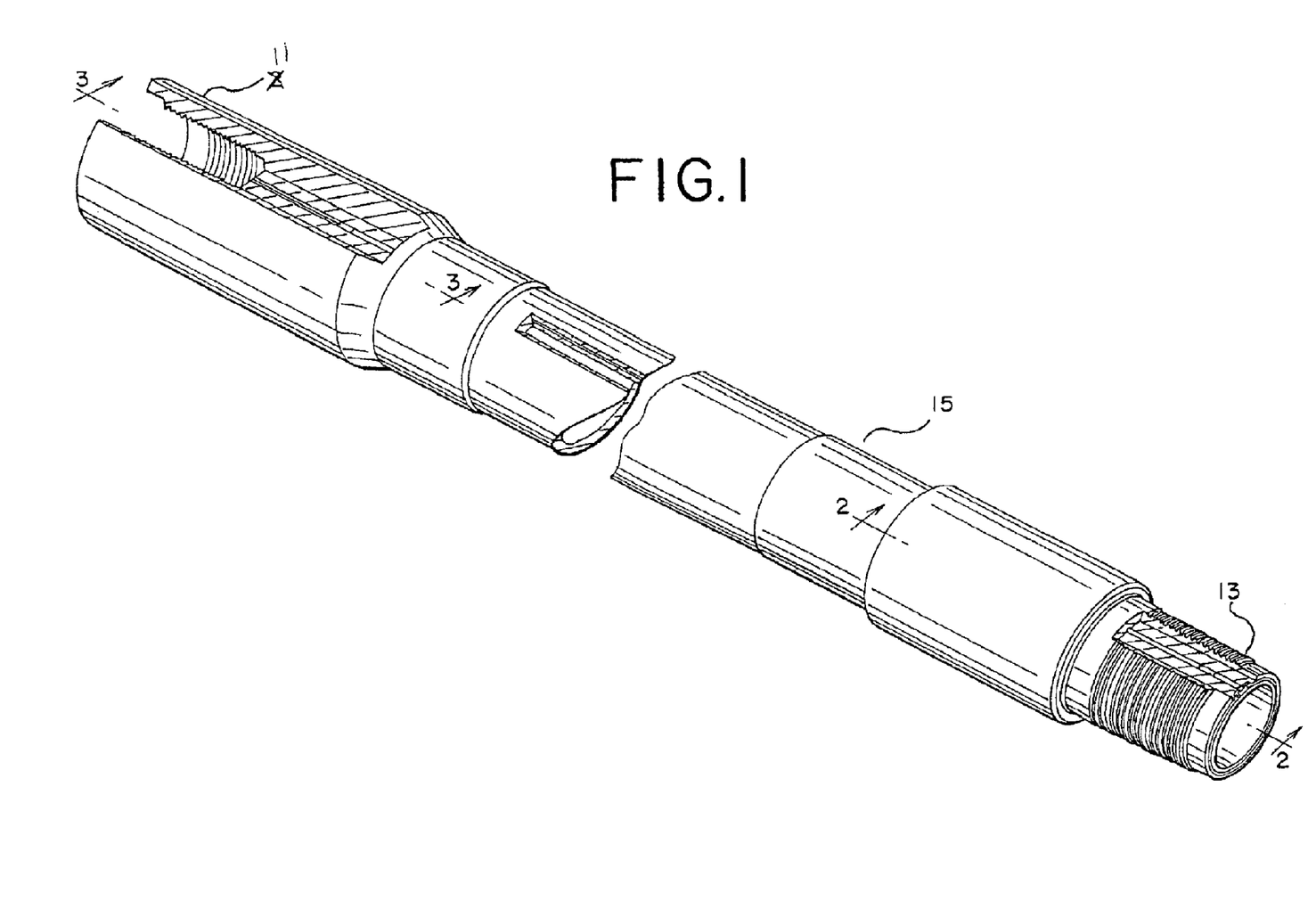
FIG. 1 is a perspective view of a section of drill pipe with cutaway sections showing the data transmission system.

Referring to the drawings, FIG. 1 is a perspective view of a section of drill pipe with cutaway sections showing the data transmission system of the present invention. The most preferred application of the connector is in the data transmission system in sections of drill pipe, which make up a drill string used in oil and gas or geothermal exploration.

Figure 2:
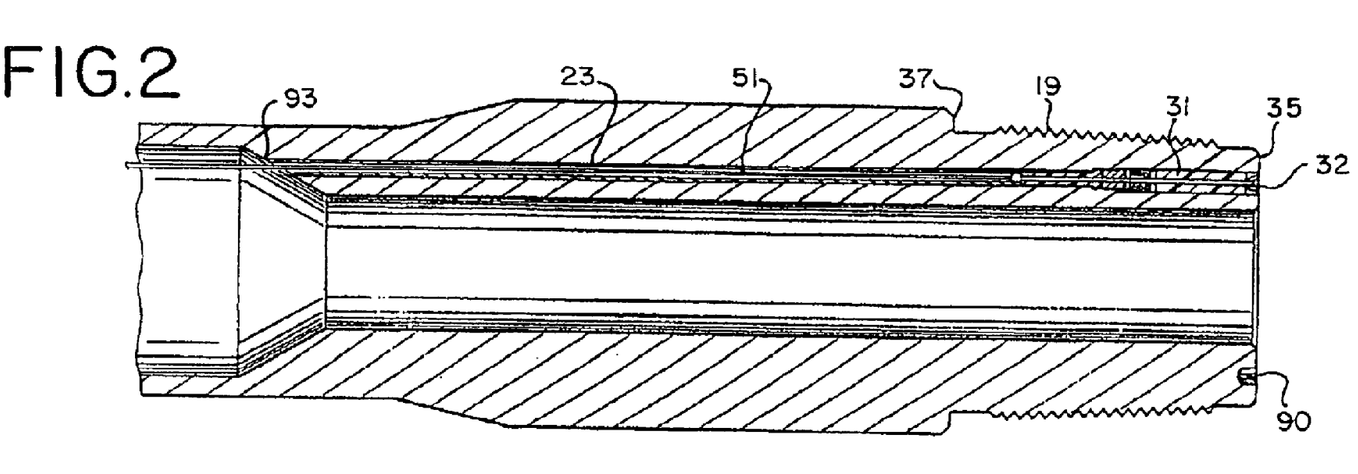
FIG. 2 is a cross-sectional view along line 2—2 of FIG. 1.
Figure 3:
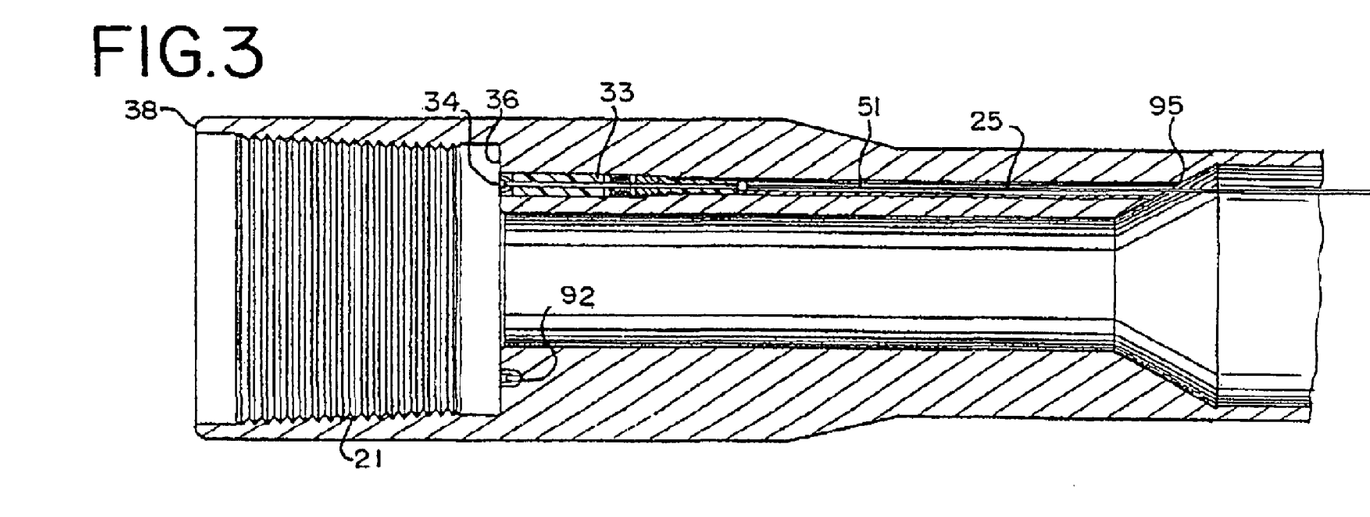
FIG. 3 is a cross sectional view along line 3—3 of FIG. 1.

The depicted section 15 of FIG. 1 includes a pin end 13, having external tapered threads 19 (see FIG. 2), and a box end 11, having internal tapered threads 21 (see FIG. 3). Between the pin end 13 and box end 11 is the body of the section. A typical length of the body is between 30 and 90 feet. Drill strings in oil and gas production can extend as long as 20,000 feet, which means that as many as 700 sections of drill pipe and downhole tools can be used in the drill string.

Figure 4:
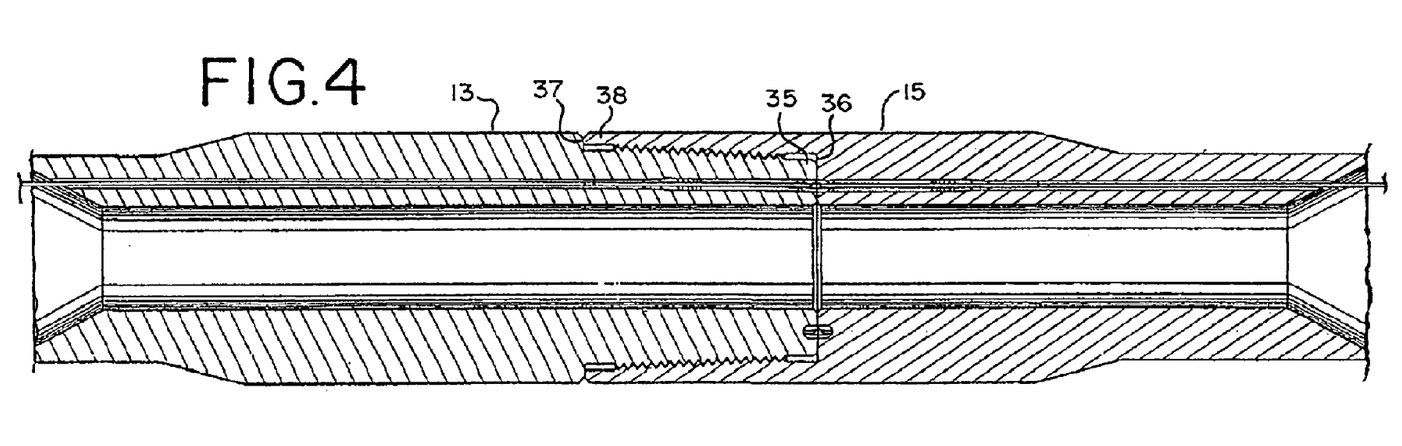
FIG. 4 is a cross-sectional view showing the pin end of FIG. 2 connected to the box end of FIG. 3.

There are several designs for the pin and box end of drill pipe. At present, the most preferred design to use with the present invention is that which is described in U.S. Pat. No. 5,908,212 to Grant Prideco, Inc. of Woodlands, Tex., the entire disclosure of which is incorporated herein by reference. As shown in FIG. 2, the pin end 13 includes an external, primary shoulder 37, and an internal, secondary shoulder or face 35. As shown in FIG. 3, the box end 11 includes an external, primary shoulder 38 and an internal, secondary shoulder or face 36. As shown in FIG. 4, when two sections of drill pipe are connected, the pin end 13 is threaded into the box end 11 with sufficient force so that the primary external shoulder 37 on the pin end engages the primary shoulder face 38 on the box end. As a result of this connection being indexed by the primary shoulder 37 and the primary shoulder face 38, the face 35 on the pin end is reliably brought into close proximity or contact with the shoulder 36 on the box end. The advantages this provides to the present invention will be discussed below.

As shown in FIG. 2, the pin end 13 preferably includes a recess 32 in the secondary or internal shoulder or face 35. Preferably, the recess is located so as to lie equidistant between the inner and outer diameter of the secondary shoulder or face 35. Alternatively, the recess is formed at either the inner or the outer diameter of the face, thereby creating a recess that is open on two sides.

Preferably, the recess is machined into the face by conventional tools either before or after the tool joint is attached to the pipe. The dimensions of the recess can be varied depending on various factors. For one thing, it is desirable to form the recess in a location and with a size that will not interfere with the mechanical strength of the pin end. Further, in this orientation, the recesses are located so as to be substantially aligned as the joint is made up. Other factors will be discussed below.

As can be seen in these figures, the recess is preferably configured so as to open axially, that is, in a direction parallel to the length of the drill string. However, in alternative embodiments, the recesses may be configured so as to open radially, that is, in a direction perpendicular to the length of the drill string. This offset configuration does not materially affect the performance of the inductive elements of the present invention whether in an axial or radial configuration.

Referring to FIGS. 1, 2, and 3, lying within the recesses 32 and 34 formed in the internal pin face 35 and internal shoulder face 36 respectively is a communication element. As will be discussed below, the preferred communication element is an inductive coil. However, other communication elements, such as acoustic transceivers, optic fiber couplers and electrical contacts are also benefited by being placed in a recess formed in the internal pin face and internal shoulder face. In particular, placing the communication elements in recesses within internal faces provides for better protection from the harsh drilling environment. Also, when using a pipe joint such as that shown in FIG. 4 that also includes external abutting faces 37 and 38, the internal faces 35 and 36 are brought together in a more reliable manner. That is, with the primary load taken by the external faces 37 and 38, the internal faces 35 and 36 are brought together with a more consistent force. Preferably, the internal faces are less than about 0.03" apart when the adjacent components are fully threaded together. More preferably, the internal faces are touching. Most preferably, the internal faces are in a state of compression.

Returning to a discussion of the preferred embodiment with inductive coils as the communication elements, it is noted that a typical drill pipe alloy, 4140 alloy steel, having a Rockwell C hardness of 30 to 35, has a magnetic permeability of about 42. The magnetic permeability of a material is defined as the ratio of the magnetic flux density B established within a material divided by the magnetic field strength H of the magnetizing field. It is usually expressed as a dimensionless quantity relative to that of air (or a vacuum). It is preferable to close the magnetic path that couples the adjacent coils with a material having a magnetic permeability higher than the steel. However, if the magnetic material is itself electrically conducting, then it provides an alternate electrical path to that offered by the adjacent loops. The currents thus generated are referred to as eddy currents; these are believed to be the primary source of the losses experienced in prior-art transformer schemes. Since the magnetic field is in a direction curling around the conductors, there is no need for magnetic continuity in the direction of the loop.

Figure 11:
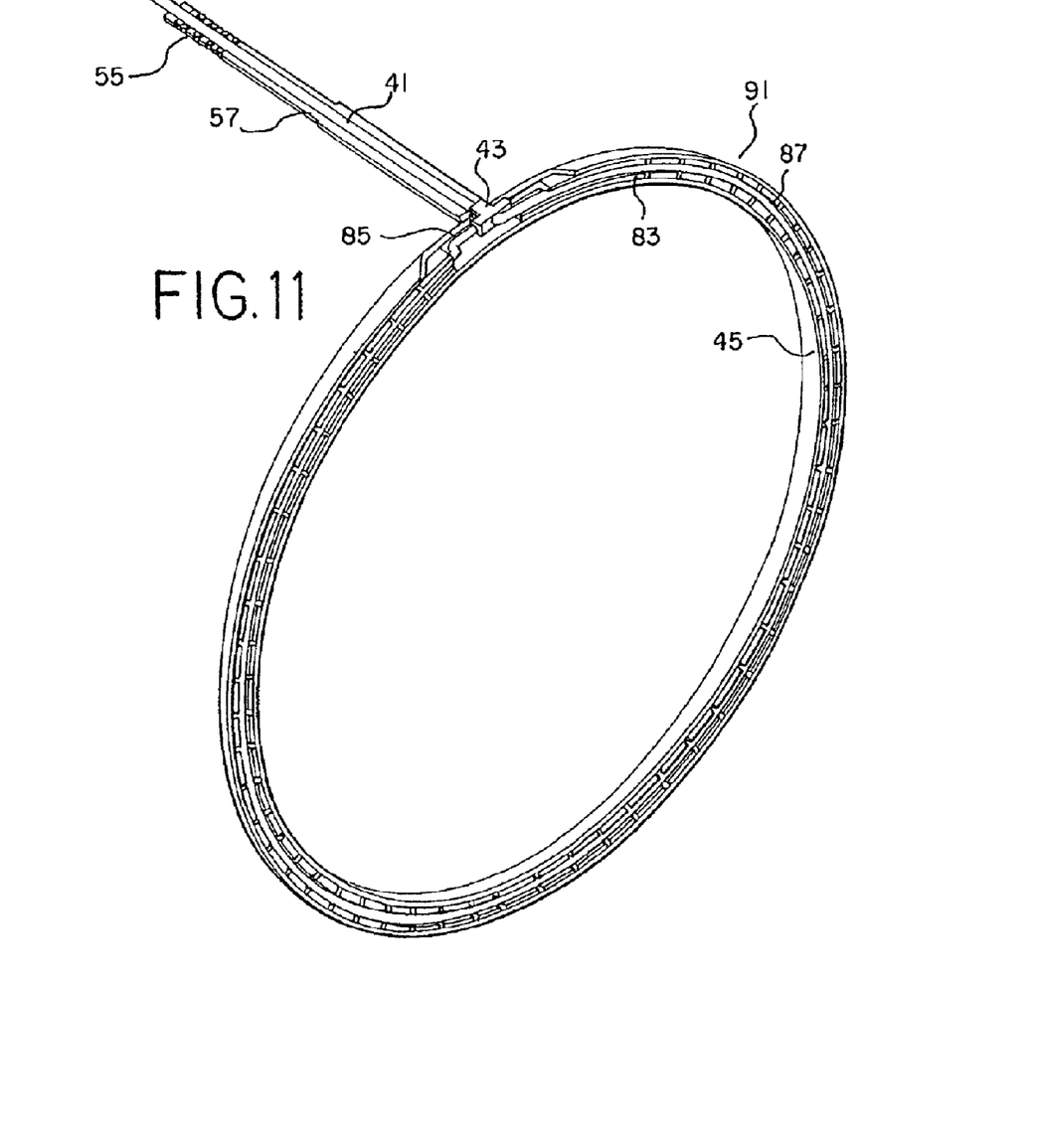
FIG. 11 is a perspective view of the communication element and steel ring.

In the preferred embodiment illustrated in FIGS. 2, 3 and 11, there is located within the recess 32 a communication element 90 and within the recess 34 an identical communication element 92. In the preferred embodiment, the communication element consists of a steel ring 45 containing a magnetically conducting, electrically insulating (MCEI) element 89, and a conductive coil 87 lying within the MCEI.

One property of the MCEI element is that it is magnetically conducting. One measure of this property is referred to as the magnetic permeability discussed above. In general, the magnetically conducting component should have a magnetic permeability greater than air. Materials having too high of a magnetic permeability tend to have hysteresis losses associated with reversal of the magnetic domains themselves. Accordingly, a material is desired having a permeability sufficiently high to keep the field out of the steel and yet sufficiently low to minimize losses due to magnetic hysteresis. Preferably, the magnetic permeability of the MCEI element should be greater than that of steel, which is typically about 40 times that of air, more preferably greater than about 100 times that of air. Preferably, the magnetic permeability is less than about 2,000. More preferably, the MCEI element has a magnetic permeability less than about 800. Most preferably, the MCEI element has a magnetic permeability of about 125.

In order to avoid or reduce the eddy currents discussed above, the MCEI is preferably electrically insulating as well as magnetically conductive. Preferably, the MCEI element has an electrical resistivity greater than that of steel, which is typically about 12 micro-ohm cm. Most preferably, the MCEI has an electrical resistivity greater than about one million ohm-cm.

The MCEI element 89 is preferably made from a single material, which itself has the properties of being magnetically conductive and electrically insulating. A particularly preferred material is ferrite. Ferrite is described in the on-line edition of the Encyclopedia Britannica as "a ceramic-like material with magnetic properties that are useful in many types of electronic devices. Ferrites are hard, brittle, iron-containing, and generally gray or black and are polycrystalline—i.e., made up of a large number of small crystals. They are composed of iron oxide and one or more other metals in chemical combination." The article on ferrite goes on to say that a "ferrite is formed by the reaction of ferric oxide (iron oxide or rust) with any of a number of other metals, including magnesium, aluminum, barium, manganese, copper, nickel, cobalt, or even iron itself." Finally, the article states that the "most important properties of ferrites include high magnetic permeability and high electrical resistance." Consequently, some form of ferrite is ideal for the MCEI element in the present invention. Most preferably, the ferrite is one commercially available from Fair-Rite Products Corp., Wallkill, New York, grade 61, having a magnetic permeability of about 125. Another preferred commercial supplier of ferrite is Gascyl Ent., Coquitlan, B.C., Canada. There are a number of other manufacturers that provide commercial products having a corresponding grade and permeability albeit under different designations.

As an alternative to using a single material that is both magnetically conductive and electrically insulating, the MCEI element can be made from a combination of materials selected and configured to give these properties to the element as a whole. For example, the element can be made from a matrix of particles of one material that is magnetically conductive and particles of another material that is electrically insulating, wherein the matrix is designed so as to prevent the conduction of electrical currents, while promoting the conduction of a magnetic current. One such material, composed of ferromagnetic metal particles molded in a polymer matrix, is known in the art as "powdered iron." Also, instead of a matrix, the MCEI element may be formed from laminations of a material such as a silicon transformer steel separated by an electrically insulating material, such as a ceramic, mineral (mica), or a polymer. Because the induced electric field is always perpendicular to the magnetic field, the chief requirement for the MCEI element is that the magnetic field be accommodated in a direction that wraps around the coil, whereas electrical conduction should be blocked in the circumferential direction, perpendicular to the magnetic field and parallel to the coil.

Figure 11A:
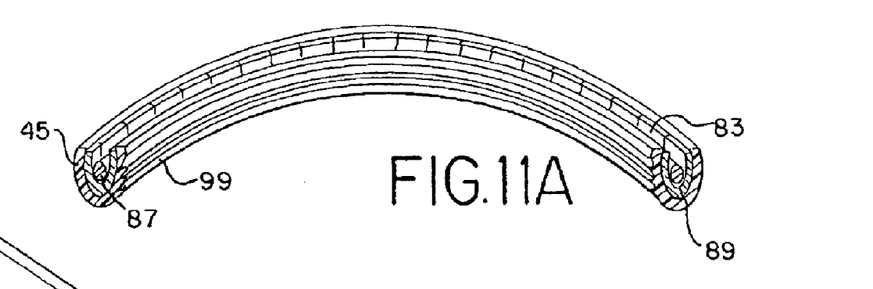
FIG. 11A is a perspective view showing a cross section of the communication element.

In a more preferred embodiment shown in FIGS. 11 and 11A, the communication element 91 contains an MCEI element. The MCEI element is formed from several segments of ferrite which are held together in the appropriate configuration by means of a resilient material, such as an epoxy, a natural rubber, polytetrafluoroethylene (PTFE), perfluoroalkoxy (PFA), a fiberglass or carbon fiber composite, or a polyurethane. A preferred method of forming a segmented MCEI element begins with providing a steel ring 45 having a generally u-shaped trough conforming to the final dimensions of the MCEI element. In a preferred embodiment, the steel ring 45 has ridges 99 around its circumference in order to enhance the connection of the steel ring to the drill pipe.

Figure 8:
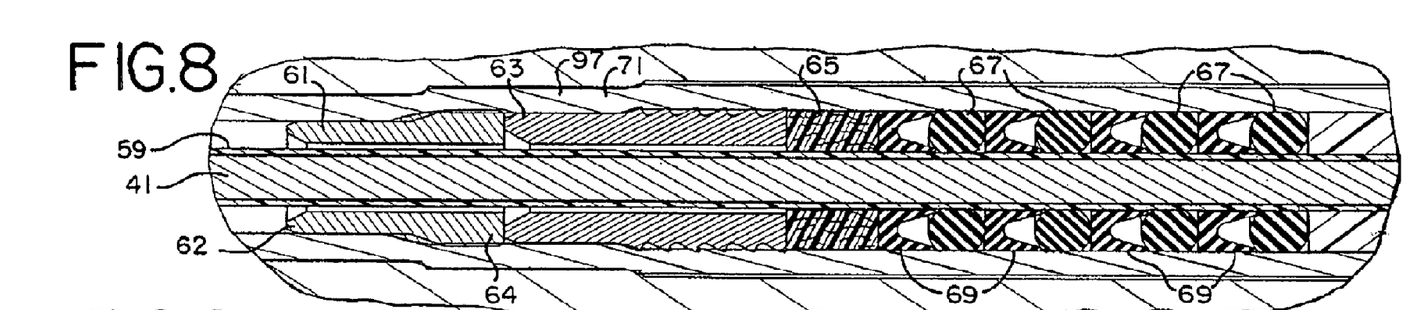
FIG. 8 is an enlarged cross-sectional view from FIG. 6 showing the placement of the expansion plug, retaining plug, and water-tight seal.
Figure 9:
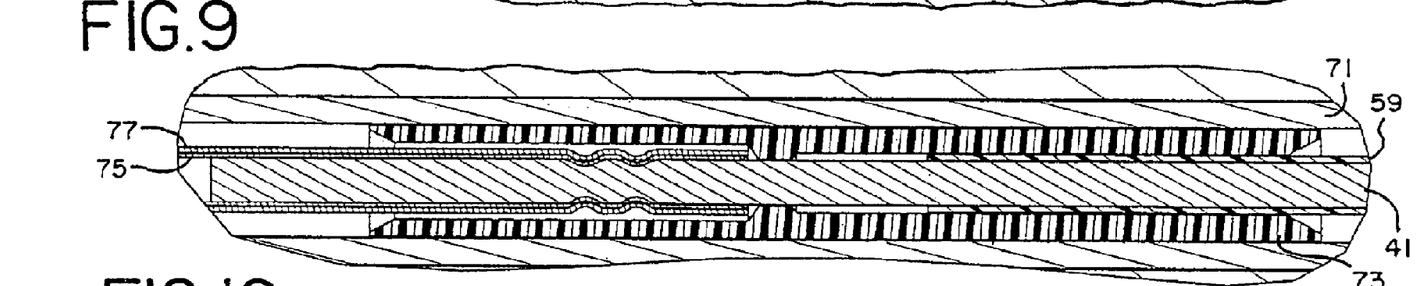
FIG. 9 is an enlarged cross-sectional view from FIG. 6 showing the placement of the centering guide.
Figure 10:
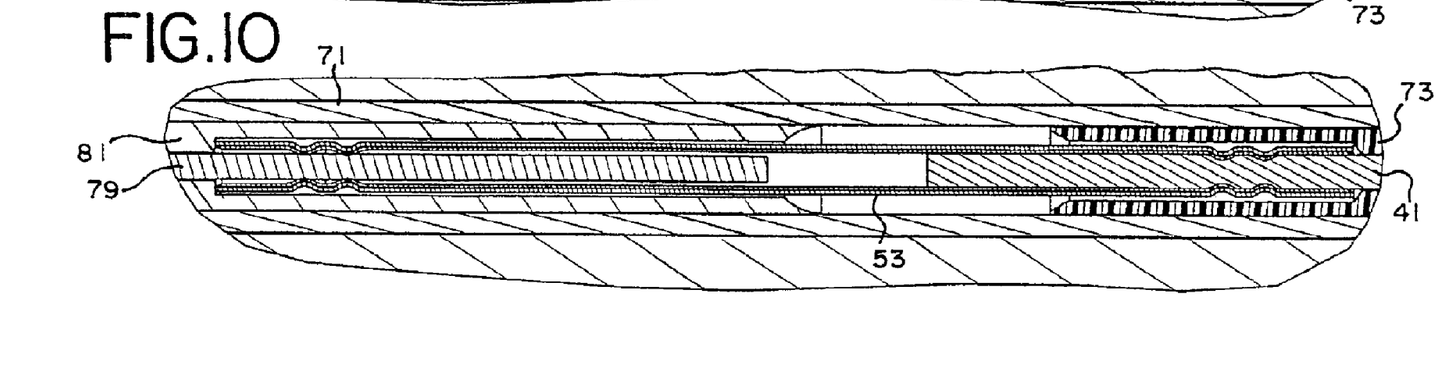
FIG. 10 is an enlarged cross-sectional view from FIG. 6 showing the connector and the end of the coaxial cable.
Figures 12, 13, 14:
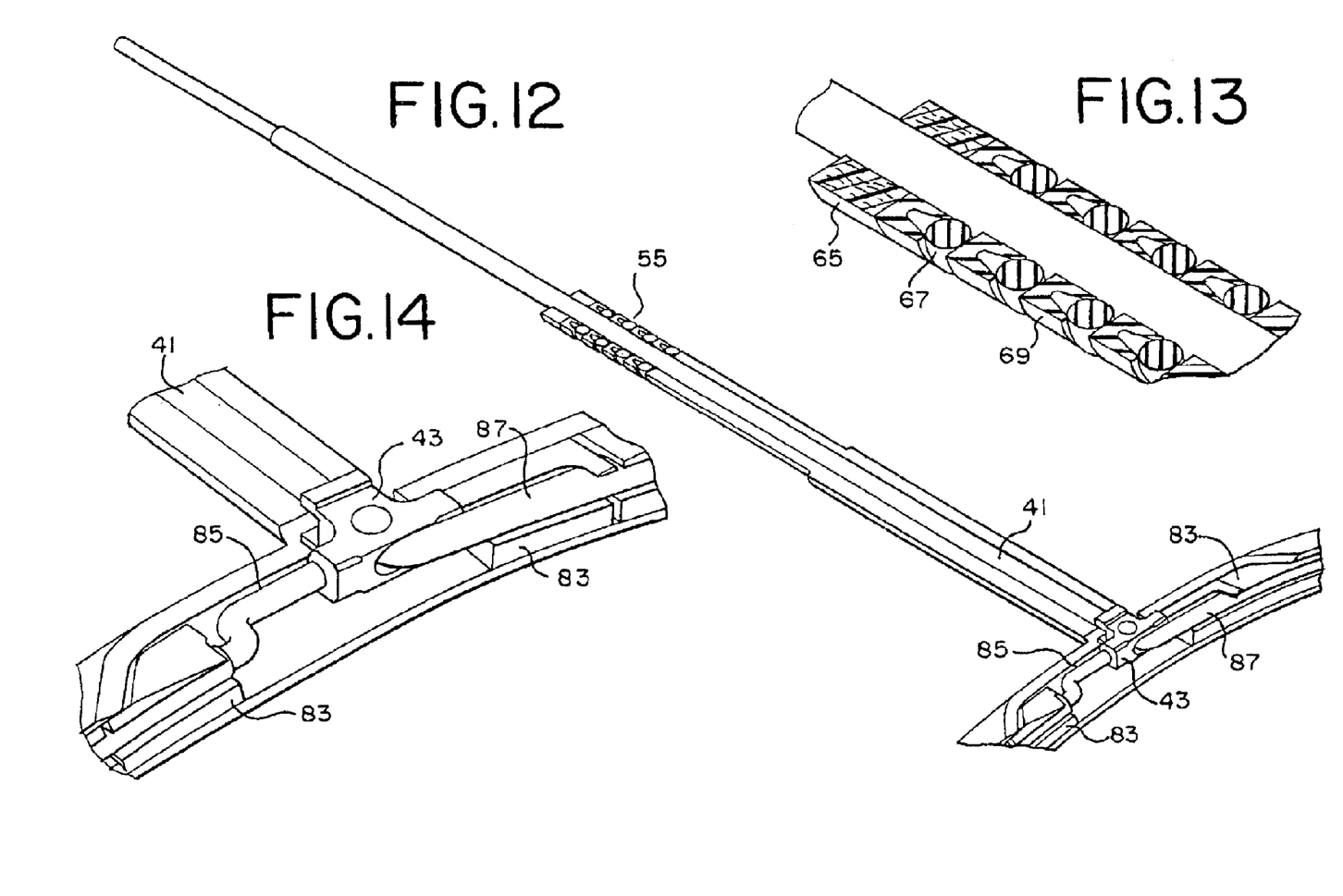
FIG. 12 is perspective view of the wire and the wire protection bridge.
FIG. 13 is an enlarged perspective view showing the water-tight seal.
FIG. 14 is an enlarged perspective view of FIG. 12 showing the wire protection bridge.
Figures 15, 16, 17:
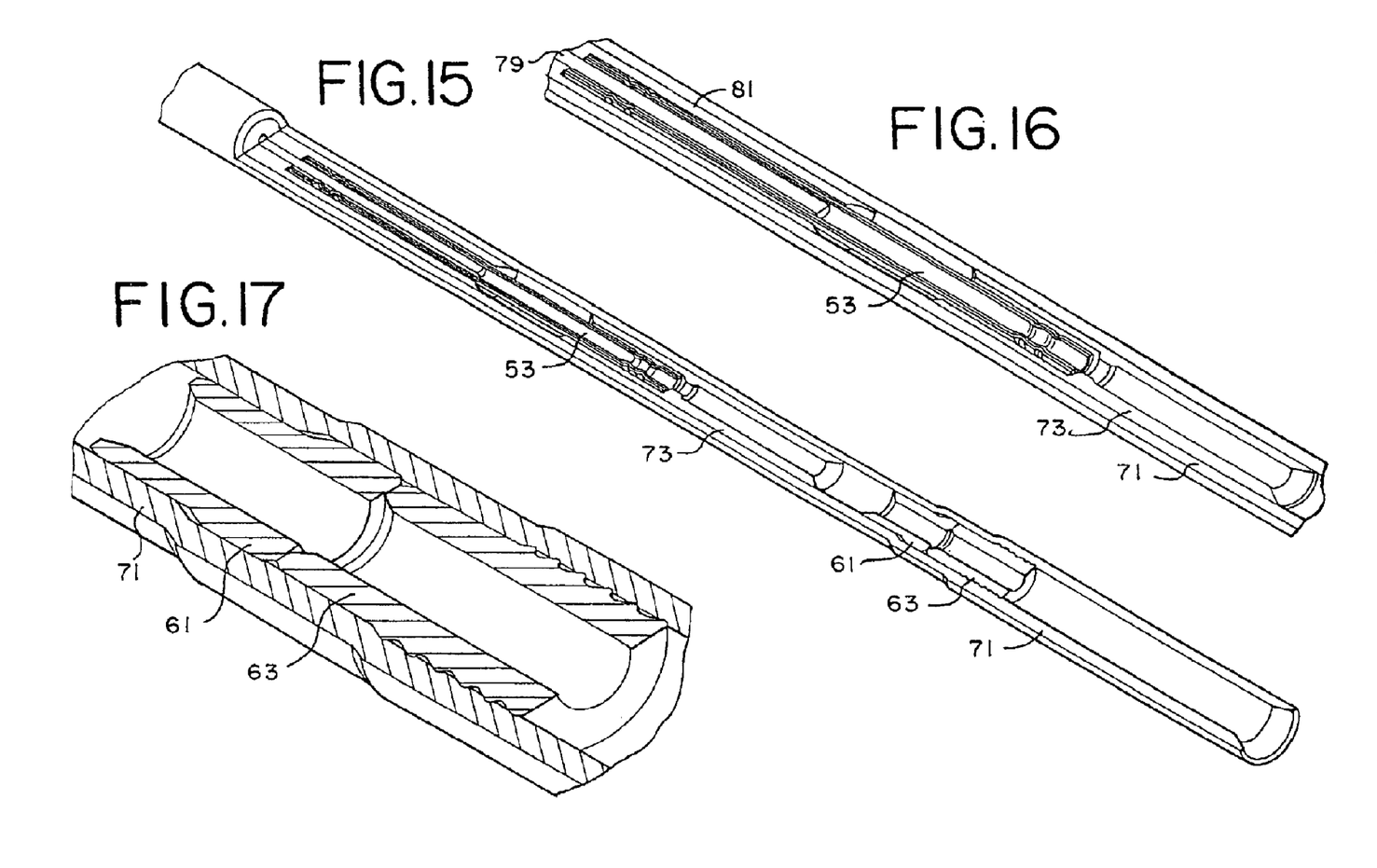
FIG. 15 is a perspective view of the conductive tube and connection elements.
FIG. 16 is an enlarged perspective view of FIG. 15 showing the centering guide and the connector.
FIG. 17 is an enlarged perspective view of FIG. 15 showing the expansion plug and the retaining plug.

The element 91 is preferably manufactured as a complete unit and is then inserted into the drill pipe, the final assembly configuration being shown in FIGS. 8, 9, and 10. To manufacture the element 91, a two-part, heat-curable epoxy formulation is mixed in a centrifuge cup. If the ferrite elements have some porosity, they can be sealed by being centrifuged for up to 30 minutes to cause all bubbles induced by mixing to rise out of the viscous liquid, and to cause the liquid to penetrate and seal any porosity in the ferrite. Most preferably, a grade of ferrite is used which has very low porosity which does not require sealing in this fashion. The individual u-shaped ferrite segments are then placed in the metal ring, except for a gap surrounding the retaining bridge 43, as shown in FIGS. 12 and 14.) Any excess epoxy is wiped out of the u-shaped groove. The upper surfaces of the parts can be precisely aligned with each other by holding them in position with magnets placed around the un-shaped trough in the mold. The epoxy is then cured, either at room temperature or in an oven.

The entire communication element 91, including the retaining bridge 43 and the wire 41, may be preassembled before the communication element 91 is inserted in the drill pipe, which can optionally be done in the field. The steel ring 45 has the advantage that it provides a durable frame upon which to house the relatively fragile MCEI. The communication element 91 may be retained in the recess 32 of FIG. 2 by means of a polymeric bonding material, preferably epoxy, polyurethane, polytetrafluoroethylene, or perfluoroalkoxy, most preferably epoxy. Most preferably, the communication element 91 is retained in recess 32 by means of a press fit.

As seen in FIGS. 11 and 11A, the communication element 91 preferably comprises a steel ring 45, an MCEI element, and a conductive coil 87. Lying within the trough 83 of the MCEI element 89 is the electrically conductive coil 87. This coil is preferably made from at least one loop of an insulated wire, most preferably only a single loop. The wire is preferably made of copper, most preferably of silver-plated copper-clad steel, and is and insulated with varnish, enamel, or a polymer. Most preferably, the wire is insulated with a tough, flexible polymer such as high density polyethylene or polymerized tetrafluoroethane (PTFE). The diameter of the wire, with insulation, is preferably selected so as to be slightly less than the width of the trough 83 in the MCEI element. As will be discussed below, the specific properties of the wire and the number of loops is important in providing proper impedance for the coil 87.

As shown in FIGS. 11 and 14, the communication element 91 has a first and second contact for connecting to the coaxial cable 51. The first contact is preferably one end of the coil 87. The first contact is preferably retained in the communication element by a retention bridge 43. The retention bridge 43 is preferably inserted in a hole in the steel ring 45, holding the first contact in place and preventing the first contact from coming into electrical contact with the second contact. The retention bridge 43 is made from an electrically insulating material, preferably PTFE, more preferably PEEK®. PEEK® is a trademark for a linear aromatic, semi-crystalline, polyetheretherketone thermoplastic polymer manufactured by Victrex PLC. A typical supplier for such material is Zeus Products, Orangeburg, South Carolina. The second contact of the communication element 91 is in electrical contact with the steel ring 45, preferably by means of a welded connection 85.

For a given application, the transformer diameter is fixed by the diameter of the pipe. The impedance of the transformer, and its desired operating frequency, can be adjusted by two factors: the number of turns in the conductor and the ratio of length to area of the magnetic path, which curls around the conductors. Increasing the number of turns decreases the operating frequency and increases the impedance. Lengthening the magnetic path, or making it narrower, also decreases the operating frequency and increases the impedance. This is accomplished by increasing the depth of the U-shaped trough or by decreasing the thickness of the side-walls. Adjusting the number of turns gives a large increment, while adjusting the dimensions of the trough enables small increments. Accordingly, the invention allows the impedance of the transformer portion of the transmission line to be precisely matched to that of the conductor portion, which is typically in the range of 30 to 120 ohms. Although an insulated copper wire is preferred, other electrically conductive materials, such as silver or copper-coated steel, can be used to form the coil 87.

As can be seen in FIG. 11, in a preferred embodiment the coil 87 is embedded within a material which fills the space within the trough of the MCEI element 89. Naturally, this material should be electrically insulating. It is also preferable that this material is resilient so as to add further toughness to the MCEI element. The preferred material to use for this purpose is a two-part epoxy formulation, preferably one filled with a powdered material such as fumed silica or fine aluminum oxide to provide abrasion resistance. The applicants have used standard commercial grade epoxy combined with a ceramic filler material, such as aluminum oxide, in proportions of about 50/50 percent. Other proportions may be desirable, but the filler material should not be less than 3 percent nor greater than 90 percent in order to achieve suitable abrasion resistance as well as adequate adhesiveness. Alternatively, other materials, such as room-temperature curable urethanes, are used. It is important that the material be able to withstand the extreme conditions found downhole. Consequently, it is important to treat the material in such a way as to ensure the absence of voids or air pockets.

As can be seen in FIG. 3, the box end 11 also includes a recess 34 similar to the recess 32 in the pin end, except that the recess 34 is formed in the internal, secondary shoulder 36 of the box end. A communication element 92, similar in all respects to the communication element 90, is located within the recess 34.

Figure 5A:
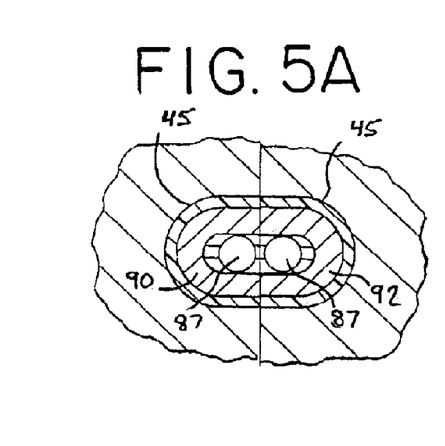
FIG. 5A is an enlarged cross-section of a connection between communication elements of a connected pin and box end.
Figure 5B:
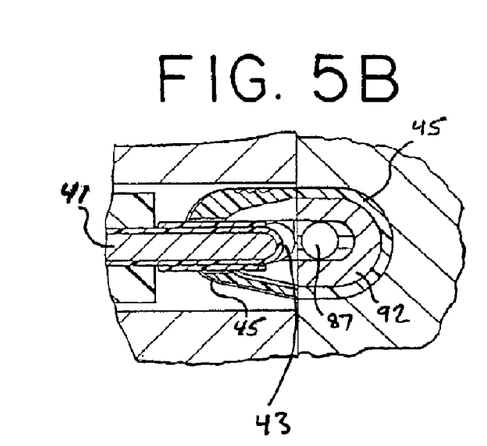
FIG. 5B is an enlarged cross-section of a connection between communication elements of a connected pin and box end, showing the protective bridge on the pin end.
Figure 5C:
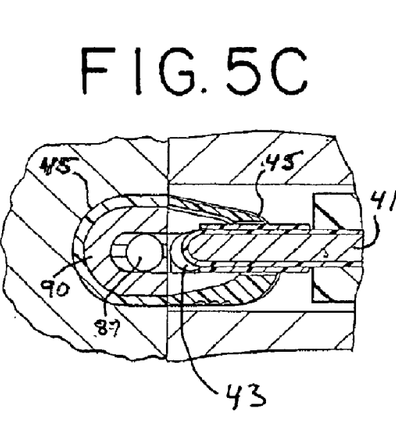
FIG. 5C is an enlarged cross-section of a connection between communication elements of a connected pin and box end, showing the protective bridge on the box end.

As can be seen in FIGS. 4, 5A, 5B, and 5C when the pin and box end are joined, the communication element 90 of the pin end and the communication element 92 of the box end are brought to at least close proximity. Preferably, the elements 90 and 92 are within about 0.5 mm of each other, more preferably within about 0.25 mm of each other. Most preferably, the elements 90 and 92 are in contact with each other. FIG. 5A is an enlarged cross-section of a connection between communications elements 90, 92 of a connected pin and box end. FIG. 5B is an enlarged cross-section of a connection between communications elements 90, 92 of a connected pin and box end, showing the protective bridge 43 on the pin end. FIG. 5C is an enlarged cross-section of a connection between communications elements 90, 92 of a connected pin and box end, showing the protective bridge 43 on the box end.

Because the faces 35 and 36 of the pin and box end may need to be machined in the field after extended use, it may preferred to design the troughs in the pin and box end with a shape and size so as to allow the first and second conductive coils to lie in the bottom of the respective troughs and still be separated a distance from the top of the respective first and second sides. As a result, the faces 35 and 36 can be machined without damaging the coils lying at the bottom of the troughs. In this embodiment, this distance is preferably at least about 0.01 inches, more preferably, this distance is at least about 0.06 inches.

Turning to FIGS. 2 and 3, the passages 23 and 25 are holes, preferably drilled from one point in the bottom of the recess 32 and 34, respectively, through the enlarged wall of the pin end and box end, respectively, so that the holes open into the central bore of the pipe section 15. The diameter of the hole will be determined by the thickness available in the particular joint. For reasons of structural integrity it is preferably less than about one half of the wall thickness. Preferably, these holes have a diameter of about between 3 and 7 mm. As can be seen from FIGS. 2, 3, and 8, the diameter of the passages 23 and 25 preferably increases slightly towards the pin recess 32 and the box recess 34. These larger diameter sections towards the pin recess 32 and the box recess 34 are called the pin connector channel 31 and the box connector channel 33.

These two holes can be drilled by conventional means. Preferably, they are drilled by a technique known as gun drilling. Preferably, the recesses can be machined and the holes can be drilled in the field, so as to allow for retrofitting of existing drill pipe sections with the data transmission system of the present invention in the field.

A conductive tube 71 is placed within the passages 23 and 25. Preferably, the conductive tube 71 runs almost the entire length of the drill pipe, beginning in the pin end connector channel 31, continuing through the pin end passage 23, passing through the hole 93 to enter the interior of the body of the pipe section, entering hole 95, continuing through the box end passage 25, and ending near the box end connector channel 33. The conductive tube 71 is preferably held in tension after it is inserted in the drill pipe 15 and remains in tension during downhole use. This prevents the conductive tube 71 from moving relative to the passages 23 and 25 during downhole use. The conductive tube is preferably made of metal, more preferably a strong metal, most preferably steel. By "strong metal" it is meant that the metal is relatively resistant to deformation in its normal use state. The metal is preferably stainless steel, most preferably 316 or 316L stainless steel. A preferred supplier of stainless steel is Plymouth Tube, Salisbury, Md.

Figure 6:
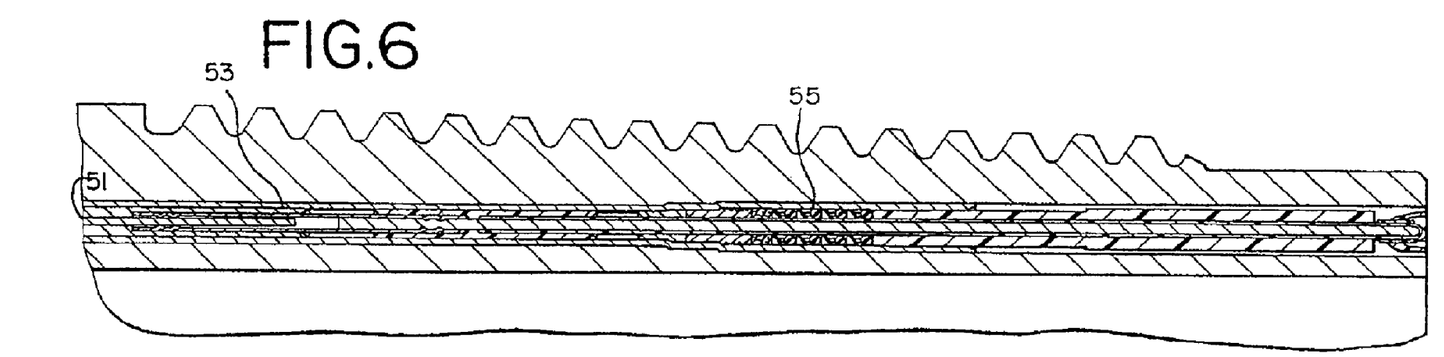
FIG. 6 is a cross-sectional view of the pin end of a drill pipe showing the connector.
Figure 7:
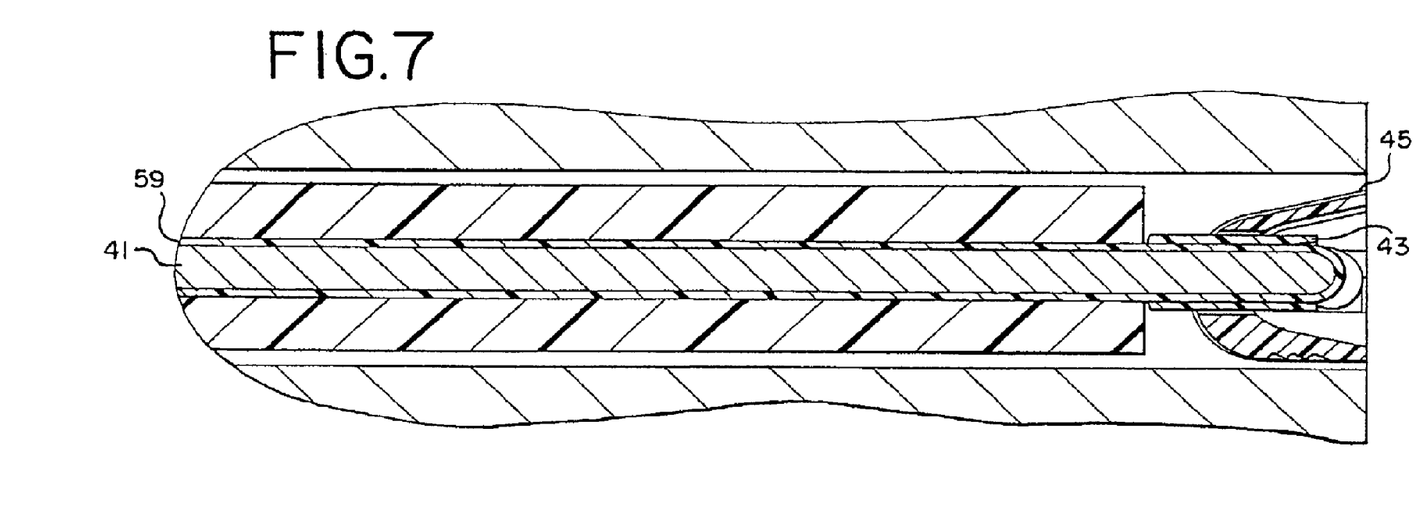
FIG. 7 is an enlarged cross-sectional view from FIG. 6 showing the placement of the magnetically connecting, electrically insulating (MCEI) element in the recess of the pin end of a drill pipe.

The elements of a preferred embodiment of the invention, from the communication element to the coaxial cable, are shown in FIGS. 6 through 10. FIGS. 7 through 10 are enlarged cross sectional views of FIG. 6 from right to left, with FIG. 7 showing an enlarged view of the right end of FIG. 6, FIGS. 8 and 9 showing enlarged views of the center, and FIG. 10 showing an enlarged view of the left side of FIG. 6.

In a preferred embodiment of the invention, the conductive tube is held in place in each end by means of an expansion plug 61 and a retaining plug 63, as shown in FIGS. 6 and 8. The expansion plug 61 preferably increases in diameter from front 62 to back 64, such that the diameter of the back 64 is larger than the initial inner diameter of the conductive tube 71. The expansion plug 61 has a center opening through which the wire 41 passes and is preferably made of metal, more preferably tool steel, most preferably Viscount 44 steel. Thus, as the expansion plug 61 is inserted in the conductive tube 71, the diameter of the conductive tube 71 is increased. The expansion plug 61 is inserted up to a distance relatively near the transition point 97, where the diameter of the passage 31 or 33 undergoes a change in diameter. The result of this insertion of the expansion plug 61 is that the diameter of the conductive tube 71 is larger on each end, so that the conductive tube 71 is held in place in the passages 31 and 33.

In a preferred embodiment, the expansion plug 61 is held in place by a retaining plug 63, as shown in FIG. 8. The retaining plug 63 is placed in the conductive tube 71 after the expansion plug 61 and has a center opening through which the wire 41 passes. The retaining plug 63 is made metal, more preferably tool steel, most preferably Viscount 44 steel. In a preferred embodiment, the retaining plug 63 has ridges along its outer diameter to dig into the inner diameter of the conductive tube 71 and hold the expansion plug 61 in place.

After exiting the holes 93 and 95, the conductive tube 71 passes through the interior of the body of the pipe section. In an alternative embodiment, the conductive tube may be insulated from the pipe in order to prevent possible galvanic corrosion. At present, the preferred material with which to insulate the conductive tube 71 is PEEK®.

As shown in FIGS. 2 and 3, the coaxial cable 51 runs inside the conductive tube 71. As shown in FIGS. 6 and 10, the coaxial cable 51 has a conductive core 79 surrounded by a dielectric sheath 81. In one embodiment of the invention, the coaxial cable 51 also has a conductive sheath surrounding the dielectric sheath 81 and in electrical contact with the conductive tube 71. The coaxial dielectric sheath 81 prevents electrical contact between the coaxial core 79 and the conductive tube 71. As shown in FIG. 10, in a preferred embodiment, an inner layer of the dielectric sheath 81 is removed from around the conductive core 79 at each end, while leaving the outer layer of the dielectric sheath 81 in place next to the conductive tube 71. This allows insertion of the connector 53 around the conductive core 79 and within the dielectric sheath 81. In another embodiment, a portion of the conductive sheath is removed at both ends to thereby providing clearance for the conductive sleeve 75.

At present, the coaxial cable preferably has a characteristic impedance in the range of about 30 to about 120 ohms, most preferably with a characteristic impedance in the range of 50 to 75 ohms. Because the attenuation of coaxial cable decreases with increasing diameter, the largest diameter compatible with installation in pipe chosen for a particular application should be used. Most preferably the cable has a diameter of about 0.25" or larger. Preferably the shield should provide close to 100% coverage, and the core insulation should be made of a fully-dense polymer having low dielectric loss, most preferably from the family of polytetrafluoroethylene (PTFE) resins, Dupont's Teflon® being one example. A foamed polymer may also be used as the core insulation.

It is preferable to select the electrical properties of the conductor so as to match the impedance of the coils to which it is attached. Preferably, the ratio of the impedance of the electrical conductor to the impedance of the first and second electrically conductive coils is between about 1:2 and 2:1. Most preferably, it is close to 1:1.

The preferred data transmission system provides a relatively broad bandwidth. While not wishing to be bound by any particular theory, it is currently believed that this is accomplished by the low number of turns of the conductor and the low reluctance of the magnetic path, thus producing a surprisingly low mutual inductance for such a large diameter coil. For a two-turn coil with a 4.75-inch diameter, the mutual inductance of the assembled toroid is about 1 micro Henry. With a 50 ohm resistive load, peak signal transmission is at about 4 MHz, and at power transmission extends from about 1 MHz to about 12 MHz. The inductive reactance is about 65 ohms, and the attenuation is only about 0.35 dB per joint, equivalent to power transmission of about 92 percent. In some respect, the communication element is thought to perform as a transmission-line transformer, wherein the coupling between the adjacent coils comprises distributed elements of both capacitance and inductance. Thus, the term "inductive coil" is intended to include both coils that transfer signals via induction as well as those coils that act as a transmission-line transformer. As adjacent segments are assembled, a serial filter is created, which has the effect of reducing the bandwidth. If each individual transformer had a narrow bandwidth, the band-pass of the filter would change as additional segments are added, which would require that each individual element be separately tuned according to its position in the system. Nevertheless, a surprising feature of the invention is that identical segments can be assembled in any arbitrary number of joints while still enabling efficient signal coupling. The 30-joint test described below gave a total attenuation of 37.5 dB (0.018% power transmission), of which 70% was in the coaxial cable itself, which was chosen to have a shield diameter of 0.047 inches. Maximum power transmission was at 4.2 MHz and the bandwidth, at half power, of 2 MHz. Thus a six volt, 90 milliwatt signal resulted in a detected signal, after 30 joints, of 80 mV.

As shown in FIGS. 6, 9, and 10, in both the pin connector channel 31 and the box connector channel 33 is a connector 53. The connector 53 permits the coaxial cable 51 to transmit an electrical signal to the communication element 91. The connector 53 has a conductive sleeve 75 which fits around the conductive core 79. The connector 53 has an insulative coating 77 to prevent electrical contact between the conductive sleeve 75 and the conductive tube 71. Preferably, the insulative coating is TEFLON®. During assembly, the connector 53 is pushed over the conductive core 79, making electrical contact with it. Preferably the connector 53 makes spring contact with the conductive core 79.

In a preferred embodiment, connector 53 fits around a wire 41, which is in electrical contact with the communication element 91. Most preferably the wire 41 is one end of the conductive coil 87. The wire 41 is preferably made of copper or silver-plated, copper-clad steel. The wire 41 has an insulative coating 59, which is made of varnish, enamel, or a polymer. Most preferably, the insulative coating 59 is a tough, flexible polymer such as high density polyethylene or polymerized tetrafluoroethane (PTFE). Preferably, the insulative coating 59 of the wire 41 is removed on the end of the wire 41 closest to the connector 53, in order to facilitate electrical contact between the conductive sleeve 75 and the wire 41. In a more preferred embodiment, the connector 53 is crimped around the wire 41 in order to ensure good electrical contact between the conductive sleeve 75 and the wire 41.

In one embodiment of the invention, as shown in FIG. 9, a centering insulator 73 is used to help position the connector 53. The centering insulator 73 is funnel-shaped at each end and is made of a dielectric material, preferably PTFE, most preferably PEEK®. The centering insulator 73 is hollow in the center, allowing it to slide around the connector 53 and guide the connector 53 towards the core 79.

In a preferred embodiment of the invention, a water-tight seal 55, as shown in FIG. 6, is present in both the pin end connector channel 31 and the box end connector channel 33 to protect the connections from the high temperature and high pressure downhole conditions. As shown in FIG. 8, in a preferred embodiment, a spacer 65 is placed between the retaining plug 63 and the water-tight seal. Most preferably, the spacer 65 is made of fiberglass. In the most preferred embodiment, the seal 55 is located proximate to the retaining plug, as shown in FIG. 8, and forms a seal between the inner surface of the conductive tube 71 and the outer surface of the wire 41. In one embodiment, the seal comprises at least one O-ring 67 and at least one backup 69. Most preferably, there are at least three O-rings 67 and three backups 69. The O-rings 67 are preferably made of rubber, more preferably fluoroelastomer, most preferably a fluoroelastomer marketed under the trademark AFLAS® or VITON®. The backups 69 are preferably made of PEEK® and have a v-shaped indentation around one end. As an O-ring 67 is compressed, it moves into the indentation in the backup 69 and causes the outer diameter of the backup 69 to press against the conductive tube 71 and the inner diameter to press against the wire 41, thus helping to maintain the water-tight seal.

In an alternative embodiment, a water-tight seal is present between the connector 53 and the inner surface of the conductive tube 71. In this embodiment, the seal is provided by at least one circumferential groove on the outside of the connector and at least one gasket fitting therein. Alternate embodiments may protect the connection with a water tight seal in other locations, such as between the coaxial core 79 and the conductive tube 71, between the connector 53 and the conductive tube 71, and between the wire 41 and the connecting channels 31 and 33.

Many types of data sources are important to management of a drilling operation. These include parameters such as hole temperature and pressure, salinity and pH of the drilling mud, magnetic declination and horizontal declination of the bottom-hole assembly, seismic look-ahead information about the surrounding formation, electrical resistivity of the formation, pore pressure of the formation, gamma ray characterization of the formation, and so forth. The high data rate provided by the present invention provides the opportunity for better use of this type of data and for the development of gathering and use of other types of data not presently available.

Preferably, the system will transmit data at a rate of at least 100 bits/second, more preferably, at least 20,000 bits/second, and most preferably, at least about 2,000,000 bits/second.

An advantage of the present invention is that it requires relatively low power and has a relatively high preservation of signal. Thus, the system preferably transmits data through at least 30 components powered only by the varying current supplied to one of the first conductive coils in one of the components. More preferably, the system transmits data through at least 50 components powered only by the varying current supplied to one of the first conductive coils in one of the components.

Preferably, the varying current supplied to the first conductive coil in the one component is driving a varying potential having a peak to peak value of between about 10 mV and about 20 V. Preferably, the power loss between two connected components is less than about 5 percent.

It is anticipated that the transmission line of the invention will typically transmit the information signal a distance of 1,000 to 2,000 feet before the signal is attenuated to the point where it will require amplification. This distance can be increased by sending a stronger signal, with attendant increased power consumption. However, many wells are drilled to depths of up to 20,000 to 30,000 feet, which would necessitate use of repeaters to refurbish the signal. Preferably, the amplifying units are provided in no more than 10 percent of the components in the string of downhole components, more preferably, no more than 3 percent.

Such repeaters can be simple "dumb" repeaters that only increase the amplitude of the signal without any other modification. A simple amplifier, however, will also amplify any noise in the signal. Although the down-hole environment is thought to be relatively free of electrical noise in the RF frequency range preferred by the invention, a digital repeater will provide a fresh signal without amplifying background noise. Most preferably, a "smart" repeater that detects any errors in the data stream and restores the signal, error free, while eliminating baseline noise, is preferred. Any of a number of known digital error correction schemes can be employed in a down-hole network incorporating a "smart" repeater.

Most preferably, the repeater not only serves to regenerate the data stream, but also serves as a data source itself. Prior to the present invention, information was available during drilling only from the bottom-hole assembly, as mud pulse data rates did not allow any intermediate nodes. With the present invention, information is available from any node along the drill string, thereby enabling distributed access to information from top to bottom. For instance, instead of relying on a single bottom hole pressure measurement, a pressure profile can now be generated along the entire drill string. This could be vital in underbalanced drilling, where to speed up drilling the pressure provided by the mud is less than that of the pore pressure in the surrounding formation. Any sudden pressure pulse or "kick" could be much more rapidly anticipated. Other types of data sources for downhole applications are inclinometers, thermocouples, gamma ray detectors, acoustic wave detectors, neutron sensors, pressure transducers, potentiometers, strain gages, seismic sources, and seismic receivers.

It is therefore intended that the foregoing detailed description be regarded as illustrative rather than limiting, and that it be understood that it is the following claims, including all equivalents, that are intended to define the spirit and scope of this invention.

Whereas the present invention has been described in particular relation to the drawings attached hereto, it should be understood that other and further modifications apart from those shown or suggested herein, may be made within the scope and spirit of the present invention.

What is claimed is:

1. A system for transmitting data through a string of downhole components, each component having a first and second end, with the first end of one component connected to the second end of an adjacent component; the system comprising:
   a first communication element located proximate the first end of the one component;
   a second communication element located proximate the second end of the adjacent component, wherein each communication element comprises a metal ring and a wire;
   a coaxial cable running between the first and second communication elements, the coaxial cable comprising a conductive tube and a conductive core within it;
   the conductive core having ends terminating within the conductive tube proximate each end of the component;
   connectors mounted at the ends of the conductive core;
   wherein each communications element is mounted in the downhole component with the wire passing first through a seal mounted within the conductive tube and then terminating at one of the connectors.

2. The system of claim 1 wherein the conductive tube runs the length of the coaxial cable.

3. The system of claim 2 wherein the conductive tube is made from a strong metal.

4. The system of claim 3 wherein the metal is steel.

5. The system of claim 4 wherein the conductive tube is held in tension relative to the down-hole component.

6. The system of claim 1 wherein the communications elements are inductive coils.

7. The system of claim 6 wherein the inductive coils are formed by a single loop of the wire.

8. The system of claim 6 wherein the inductive coils each comprise at least one loop of the wire set in a circular trough, wherein the wire comprises a first end and a second end, which first end is a first contact and which second end is a second contact.

9. The system of claim 8 wherein the trough is formed of segments of a magnetically conducting, electrically insulating material.

10. The system of claim 9 wherein the trough comprises ferrite.

11. The system of claim 9 wherein the segments are retained within a groove formed in the metal ring.

12. The system of claim 11 wherein the segments and the wire are encapsulated by an insulating material.

13. The system of claim 12 wherein the insulating material is selected from the group consisting of polyurethane, polytetrafluoroethylene, perfluoroalkoxy, or epoxy.

14. The system of claim 11 wherein the metal ring comprises a hole through which at least the first end of the wire passes.

15. The system of claim 14 wherein the second end of the wire, the metal ring and the conductive tube are in electrical contact with each other, and the first end of the wire is in electrical contact with a conductive sleeve.

16. The system of claim 8 wherein the first end of the wire passes through a retaining bridge, which insulates the first end of the wire from the metal ring.

17. The system of claim 1 wherein the components are sections of drill pipe, each having a central bore passing therethrough, and wherein the first and second communication elements are located within a first and second recess respectively at the first and second end of the drill pipe, and further comprising a first passage passing between the first recess and the central bore and a second passage passing between the second recess and the central bore and wherein the first and second connectors are located in the first and second passages respectively.

18. The system of claim 17 wherein each section of drill pipe has a portion with an increased wall thickness at both the first and second ends with a resultant smaller diameter of the central bore the first and second ends, and wherein the first and second passages run through the portions with an increased wall thickness and generally parallel to the longitudinal axis of the drill pipe.

19. The system of claim 18 wherein the first and second passages each have a larger diameter portion and a smaller diameter portion, the larger diameter portion being closer to the first and second recesses respectively and the smaller diameter portion being closer to the end of the passage which exits into the central bore, and wherein the first and second connectors are located within the larger diameter portions of the first and second passages respectively.

20. The system of claim 18 wherein the conductive tube runs at least the length of the coaxial cable, and wherein the conductive tube has an outside diameter along most of its length that fits within the smaller diameter portions of the first and second passages and an increased outside diameter at both ends which fits within the larger diameter portions of the first and second passages, but which increased outside diameter does not fit within the smaller diameter portions, thereby retaining the coaxial cable in place within the section of drill pipe.

21. The system of claim 20 further comprising a first and second expansion plug, each of which includes a central passage and each of which is press-fit within the conductive tube so as to maintain the increased outside diameter of the conductive tube within the larger diameter portions of the first and second passages respectively.

22. The system of claim 21 further comprising a first and second retaining plug adjacent the respective first and second expansion plugs, each of which retaining plugs includes ridges on its outer surface to retain the expansion plugs in place.

23. The system of claim 21 where the expansion plugs and retaining plugs are made from steel.

24. The system of claim 1 wherein the coaxial cable further comprises a dielectric material between the conductive tube and the conductive core and running most of the length of the cable, but absent at both ends of the cable to thereby facilitate connection to the first and second connectors.

25. The system of claim 24 wherein the coaxial cable further comprises a conductive sheath outside of the dielectric material and inside the conductive tube, and wherein the conductive sheath runs most of the length of the cable but is absent at both ends of the cable to thereby facilitate connection to the first and second connectors.

26. The system of claim 1 wherein each connector further comprises a guide for the conductive sleeve, which guide is made from a dielectric material and which includes a guide passage through which the conductive sleeve passes, which guide passage is funnel-shaped at one or both ends.

27. The system of claim 1 further comprising a water-tight seal between the outer surface of the conductive sleeves and the inner surfaces of each end of the conductive tube.

28. The system of claim 27 wherein the seal is adapted to withstand pressures of at least 25,000 pounds per square inch and temperatures of at least 200 degrees Celsius.

29. The system of claim 27 wherein the seal is provided by at least one O-ring.

30. The system of claim 1 wherein the first and second communication elements each comprise an inductive coil having at least one loop of wire, wherein in each communication element, a first contact comprises a first end of the wire and a second contact comprises a second end of the wire, and wherein the first and second connectors each further comprise a water-tight seal between the second end of the wire and the inside of the conductive tube.

31. The system of claim 30 wherein the water-tight seal comprises at least one gasket through which the first end of the wire passes and which forms a seal with the inner surface of the conductive tube.

32. The system of claim 31 wherein the seal is adapted to withstand pressures of at least 20,000 pounds per square inch and temperatures of at least 200 degrees Celsius.

33. The system of claim 31 wherein the gasket is made from a material selected from the group consisting of pyrophylite, rubber fiberglass, and fluoroelastomer.

34. The system of claim 33 wherein the gasket comprises an O-ring.

35. The system of claim 34 where each O-ring is adjacent to a locking ring, which locking ring tends to hold the O-ring in place under downhole conditions.

36. The system of claim 30 wherein the first and second connectors further comprise a second water-tight seal between the outside surface of the conductive sleeve and the inside surface of the conductive tube.

37. A communications element for a downhole component,
    the downhole component comprising a conductive tube terminating at an end of the downhole component and a coaxial cable within the conductive tube;
    the coaxial cable comprising a conductive core and a dielectric sheath;
    the coaxial cable terminating within the conductive tube at the end of the downhole component;
    a connector mounted on the conductive core at the termination of the coaxial cable;
    a seal mounted within the conductive tube intermediate the connector and the termination of the conductive tube;
    the communications element comprising a metal ring and a wire;
    wherein the communications element is mounted at the end of the downhole component with the wire passing through the seal and terminating within the connector.

38. The communications element of claim 37, wherein the communications element is selected from the group consisting of inductive couplers, acoustic transceivers, and electrical contacts.

39. The communications element of claim 37, wherein the connector comprises a conductive sleeve in electrical contact with the conductive core.

40. The communications element of claim 39, wherein the connector is slideable over the end of the conductive core.

41. The communications element of claim 40, wherein a funnel-shaped insulator guides the slideable connector over the end of the conductive core.

42. The communications element of claim 37, wherein said dielectric sheath is intermediate the conductive tube and the conductive core.

43. The communications element of claim 37, wherein the wire comprises a first end in electrical contact with the conductive sleeve.

44. The communications element of claim 37, wherein the wire comprises a second end in electrical contact with a steel ring.

45. The communications element of claim 37, wherein the wire is at least 0.01 inches from the top of the communications element.

46. The communications element of claim 37 wherein the metal is steel.

47. The communications element of claim 38 wherein the inductive coupler is formed by a single loop of wire.

48. The communications element of claim 38 wherein the inductive coupler comprises at least one loop of wire set in a circular trough, wherein the wire comprises a first end and a second end, which first end is the first contact and which second end is the second contact.

49. The communications element of claim 48 wherein the trough is formed of segments of a magnetically conducting, electrically insulating material.

50. The communications element of claim 49 wherein the trough comprises ferrite.

51. The communications element of claim 49 wherein the segments are retained within a groove formed in the metal ring.

52. The communications element of claim 51 wherein the segments and the wire are encapsulated by an insulating material.

53. The communications element of claim 52 wherein the insulating material is selected from the group consisting of polyurethane, polytetrafluoroethylene, perfluoroalkoxy, or epoxy.

54. The communications element of claim 51 wherein the metal ring comprises a hole through which at least the first end of the wire passes.

55. The communications element of claim 54 wherein the second end of the wire, the metal ring and the conductive tube are in electrical contact with each other, and the first end of the wire is in electrical contact with the conductive sleeve.

56. The communications element of claim 55 wherein the first end of the wire passes through a retention bridge, which insulates the first end of the wire from the metal ring.

* * * * *